2,865,977

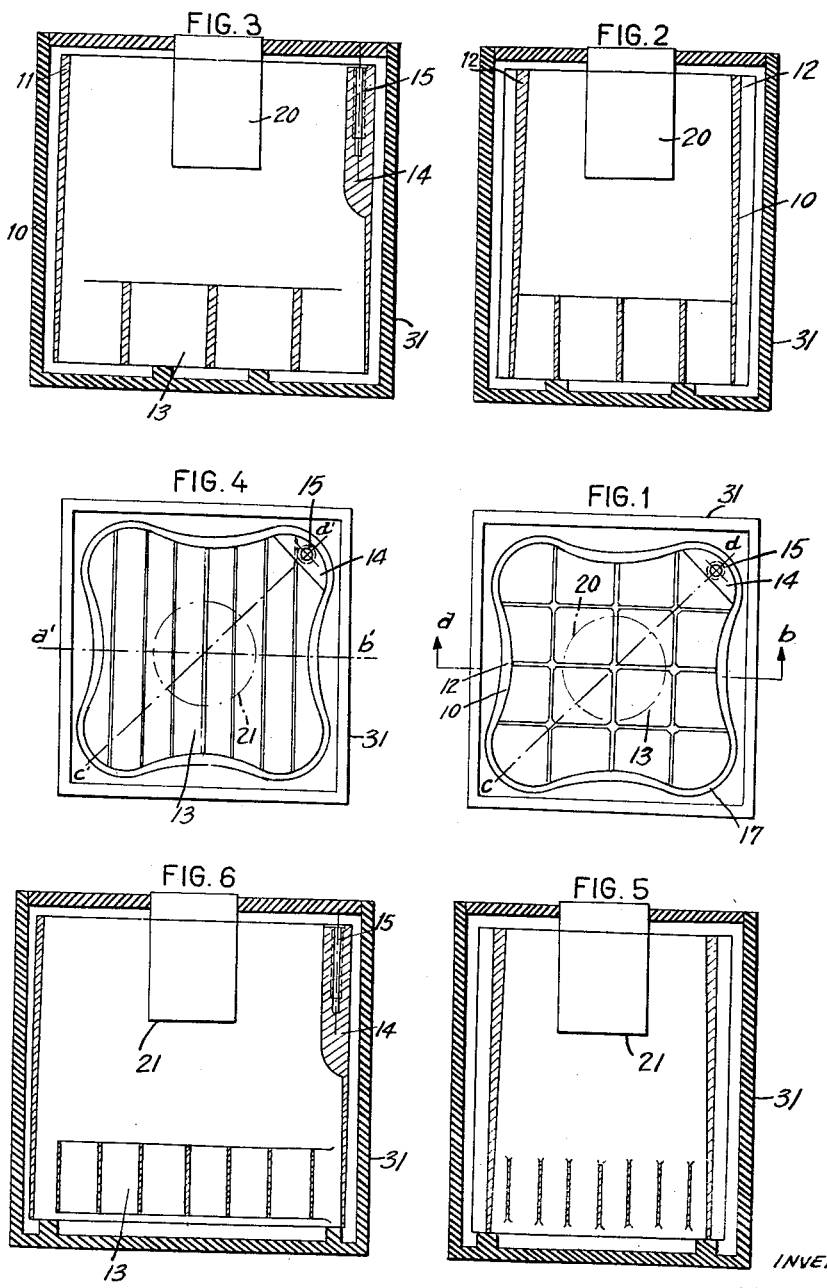

NEGATIVE ELECTRODE FOR PRIMARY CELLS

Jules Moyns, Poitiers, France, assignor to Societe de la Pile Leclanché, Chasseneuil du Poitou (Vienne), France, a corporation of France Application May 21, 1953, Serial No. 356,404

9 Claims. (Cl. 136—128)

It has been proposed already, for primary cells having an alkaline electrolyte, to give the two electrodes and container such dimensions and relative shapes that the paths for ionic exchanges between the electrodes have very varied lengths. Such primary cells are described in French Patent 1,001,750, filed on November 30, 1949, of which the French application, filed April 21, 1952, on which the present application is based is an addition.

This French patent, filed in the name of the assignee of the present application, dealt with the phenomena of passivation and inversion which occurs in primary cells having a positive and a negative electrode and an alkaline electrolyte therebetween.

As described in this French patent, the phenomenon of passivation is due to a superficial modification of the negative electrode. Since, ordinarily, aside from such passivation phenomenon, primary cells of the type described hereinabove still offer a considerable useful life in that the normal possibilities of the different constituents of the cell are far from being exhausted, this French patent provides a solution of counteracting or preventing such passivation.

For that purpose, the French Patent 1,001,750 suggests that the paths of ionic exchanges between the electrodes be so arranged as to have varied lengths. In accordance with this French patent, this is obtained by providing a circular positive electrode and a non-circular negative electrode surrounding the same. According to a modified embodiment of this French patent, both the positive and negative electrodes are circular. However, the negative electrode may be provided with apertures in the upper part thereof to effectively produce paths of different lengths for the ionic exchanges.

The present invention relates to an improvement of the negative electrode in accordance with the teachings of a primary cell of the type described in the French patent, and more particularly, to a negative electrode cast integrally or made of one piece to further enhance and improve the beneficial results obtained thereby.

It is accordingly an object of the present invention to provide a negative electrode for cells using an alkaline electrolyte and a positive electrode as described, for example, in the French Patent 1,001,750, characterized in that it comprises a tubular portion comprising, at its lower portion, a series of recesses formed by crosspieces leading to said tubular electrode.

The invention will be better understood from the following description with reference to the appended drawing wherein:

Figure 1 is a plan view of a negative electrode according to the present invention.

Figure 2 is a sectional view along plane *ab* through the negative electrode.

Figure 3 is a sectional view through the plane *cd* of Figure 1.

Figures 4 to 6 correspond respectively to Figures 1 to 3 for another non-limitative example of a negative electrode according to the present invention.

The present invention essentially consists of a negative electrode for use in a primary cell provided with a positive electrode surrounded by the negative electrode and with an alkaline electrolyte whereby the negative electrode is made in one piece, for example, by casting metals such as zinc in a mold of suitable shape or by extrusion methods with certain elements of the electrode attached thereto in any suitable manner, such negative electrode being so shaped as to produce in cooperation with the positive electrode paths of ionic exchanges having different lengths and being provided at the lower portion thereof with a plurality of recesses formed by cross pieces rigidly connected or formed integrally with the negative electrode.

As shown in Figures 1 to 3, the positive electrode of suitable construction as disclosed in the French Patent 1,001,750 is surrounded by the negative electrode which comprises a main portion in the shape of a straight parallelepipedal tube 10 the angles or corners of which 11 may be rounded; the faces of said electrode may be plane or preferably concave, and the thickness of each face of the parallelepiped is reinforced in the middle portion 12 thereof so as to increase the density of ionic exchanges The main portion 10 comprises, at its lower portion, a series of recesses 13 formed by crosspieces placed perpendicularly to one another so as to form squares in the central area.

The metal forming these recesses 13 is cast integral with the main portion 10, i. e. the assembly of the soluble electrode and its recesses is in one piece.

This series of recesses 13 is placed in locations and at distances remote from the depolarizing agglomerate, so that the current density therethrough is less than on the parallelepipedal portion. Should the passivation of the cell tend to occur in areas subjected to a heavy current density, it will be counteracted by the presence, on the same negative electrode, of low current density areas.

Due to this lesser participation in ionic exchanges of the lower portion of the negative electrode with respect to the upper portion, the amount of available metal may be decreased thereat. Figures 2 and 3 show the corresponding variation in thickness of the metal, generally zinc.

For connecting the cell with the outside circuit, there is provided, in one of the dihedrons 11 a boss 14 which, owing to its shape, also helps to counteract passivation; the negative connection may be fastened in recess 15 of the boss 14.

The positive electrode 21 may be again of any suitable construction as shown in the aforementioned French patent, and the negative electrode in Figures 4 to 6 has a shape similar to that of the electrode of Figures 1 to 3; it differs therefrom by the shape of the recesses formed by parallel and unidirectional crosspieces.

Other variations in the shapes of the negative electrode and its recesses may be imagined without any difficulty, in accordance with the main inventive concept of the present invention as defined at the beginning of the present specification, as well as in the main French Patent 1,001,750. For example, the angles or corners 11 may form non-rounded-off corners. Furthermore, the recesses 13 could also be made to have shapes different from the square shape in Figure 1, for example, in the shape of rectangles, rhombus, or any other suitable, preferably symmetrical, shape.

The manufacture of such an electrode may be effected simply in one piece by casting metal in a mould of suitable shape; this same electrode, however, could also be manufactured by modern extrusion methods, certain elements of the electrode being then attached thereon by soldering or any other means, and this within the scope of the present invention.

According to the present invention it is possible to help preventing the passivation of the negative electrode by causing different crystallizations in the various areas of the electrode; for instance, the main portion 10 may be given a different crystallization from that assigned to the portion comprising the series of recesses 13.

This result is easily achieved when the electrode is manufactured by casting; the two portions of the electrode are subjected to different cooling speeds. The same result is obtained by annealing of a predetermined portion of the electrode which modifies the initial crystallization.

Finally, according to the present invention, another means is provided for opposing passivation by creating different potentials over the surface of the negative electrode, by amalgamating the surface with variable mercury contents according to the electrode area. The presence of mercury causes potential variations in each area of the negative electrode, due, on the one hand, to the mercury's own potential, and, on the other hand, to changes in the crystallization of the negative electrode metal caused by the action of this mercury.

The amalgamation of the electrode is obtained by conventional means applied in such a manner as to give the desired result: for instance, the use of a mercuric chloride solution of a given concentration, in which various portions of the negative electrode are immersed during different times; or by using during the same time, mercuric chloride solutions with different concentrations.

What is claimed is:

1. A unitary negative electrode made of one piece for use with a primary cell having a positive electrode and an alkaline electrolyte, said negative and positive electrode being of such shape as to provide paths for the ionic exchange therebetween of varied lengths, said negative electrode being intended to prevent polarization during discharge thereof and comprising a substantially unitary tubular member having a main portion operative at relatively high current densities and another auxiliary portion near one end thereof operative at relatively low current densities to counteract passivation of said negative electrode and to minimize the ohmic resistance between said main and auxiliary portions, and a plurality of cross pieces forming partitions extending essentially parallel to the axial direction of said tubular member and being rigidly connected with said another portion of said tubular member along the inside thereof to thereby reinforce said tubular member at the height of said auxiliary portion.

2. A unitary negative electrode according to claim 1, wherein said cross pieces are constituted by a series of orthogonal partitions.

3. A unitary negative electrode according to claim 1, wherein said cross pieces are constituted by a series of partitions parallel with respect to each other.

4. A negative electrode according to claim 1 wherein the thickness of the wall of said tubular member forming said negative electrode decreases from an upper portion to the lower extremity thereof at the lower side of said partitions.

5. A negative electrode according to claim 1 wherein said tubular part is a straight tube of quadrangular cross section with walls of concave shape as seen in a plane perpendicular to the axis of said tubular member.

6. A negative electrode according to claim 1 wherein said tubular member is of quadrangular cross section and wherein the thickness of the wall of said tubular member is a maximum in the center portion of each of the four sides thereof and decreases toward the respective corners thereof as seen in a plane perpendicular to the axis of said tubular member.

7. A negative electrode according to claim 1 wherein the tubular member is formed by a straight tube of quadrangular cross section with walls of concave shape in a plane perpendicular to the axis of said tubular member, the thickness of each side of said tubular member being a maximum in the middle portion thereof and decreasing toward the respective corners as viewed in a plane perpendicular to the axis of said tubular member.

8. A negative electrode according to claim 1 wherein the tubular member of the negative electrode is formed by a straight tube of rectangular cross section, and wherein one of the vertically edged dihedrons of said straight tube includes at the apex thereof a reinforcing boss for attaching the electrical connection.

9. A negative electrode according to claim 8 wherein the dihedrons of the quadrangle are rounded off at the apexes.

References Cited in the file of this patent

UNITED STATES PATENTS

| 1,267,349 | Smith | May 21, 1918 |
| 1,725,592 | Mertes | Aug. 20, 1929 |
| 2,085,269 | Oppenheim | June 29, 1932 |
| 2,118,712 | Oppenheim | May 24, 1938 |
| 2,629,758 | Ruben | Feb. 24, 1953 |

FOREIGN PATENTS

| 587,470 | Great Britain | Apr. 28, 1947 |
| 68,276 | Denmark | Jan. 3, 1949 |
| 1,001,750 | France | Oct. 24, 1951 |